US009751118B2

(12) United States Patent
McLaughlin et al.

(10) Patent No.: US 9,751,118 B2
(45) Date of Patent: Sep. 5, 2017

(54) WASTE COMPACTOR

(71) Applicant: Wastequip, LLC, Charlotte, NC (US)

(72) Inventors: Jonathan P. McLaughlin, Orlando, FL (US); Alex Batista, Cherry Hill, NJ (US); Kirk Warren, Cherry Hill, NJ (US)

(73) Assignee: Wastequip, LLC, Charlotte, NC (US)

( * ) Notice: Subject to any disclaimer, the term of this patent is extended or adjusted under 35 U.S.C. 154(b) by 1063 days.

(21) Appl. No.: 13/908,511

(22) Filed: Jun. 3, 2013

(65) Prior Publication Data

US 2013/0319264 A1 Dec. 5, 2013

Related U.S. Application Data

(60) Provisional application No. 61/654,458, filed on Jun. 1, 2012.

(51) Int. Cl.
| B30B 15/28 | (2006.01) |
| B30B 15/30 | (2006.01) |
| B09B 3/00 | (2006.01) |
| B30B 9/30 | (2006.01) |

(52) U.S. Cl.
CPC ........... B09B 3/00 (2013.01); B30B 9/301 (2013.01); B30B 9/3042 (2013.01); B30B 9/3046 (2013.01); B30B 15/28 (2013.01); B30B 15/281 (2013.01); B30B 15/30 (2013.01)

(58) Field of Classification Search
CPC ... B30B 9/3021; B30B 9/3031; B30B 9/3042; B30B 9/3057; B30B 9/3078; B30B 9/3046; B30B 9/301; B30B 1/32; B30B 15/30; B30B 15/28; B30B 15/281; B65F 9/00; B65F 1/1405; B65F 3/001; B65F 3/28; B65F 3/26; B65F 3/201; B09B 3/00
USPC .............. 100/245, 345, 99, 215, 229 A
See application file for complete search history.

(56) References Cited

U.S. PATENT DOCUMENTS

| 3,229,622 | A | * | 1/1966 | French | B30B 9/3042 100/126 |
| 3,250,414 | A | * | 5/1966 | Pioch | B30B 9/3042 100/214 |
| 3,613,569 | A | * | 10/1971 | Liberman | B30B 9/3042 100/215 |
| 3,625,140 | A | | 12/1971 | Glanz | |
| 3,753,506 | A | * | 8/1973 | Palmer | B65F 9/00 100/215 |
| 4,007,677 | A | * | 2/1977 | Fox | B30B 9/30 100/215 |
| 4,372,726 | A | * | 2/1983 | Lutz | B30B 9/3042 100/193 |
| 4,374,491 | A | * | 2/1983 | Stortroen | A61L 11/00 100/215 |

(Continued)

Primary Examiner — Jimmy T Nguyen
(74) Attorney, Agent, or Firm — Nelson Mullins Riley & Scarborough LLP

(57) ABSTRACT

The invention is generally applicable to a waste compactor. More specifically, the invention is applicable to a waste compactor including a secondary fill door that allows the operator to fill the waste compactor without cycling the waste compactor to conserve energy, increase the life expectancy of the compactor, reduce the number of compaction cycles that may be necessary to compact the contents of the container and/or permit loading of the waste compactor even when the waste compactor is inoperable.

8 Claims, 3 Drawing Sheets

(56) References Cited

U.S. PATENT DOCUMENTS

| | | | |
|---|---|---|---|
| 4,557,658 A | 12/1985 | Lutz | |
| 4,603,625 A | 8/1986 | Brown | |
| 5,044,870 A * | 9/1991 | Foster | B30B 9/3042 414/398 |
| 5,193,455 A * | 3/1993 | Lackner | B30B 9/3021 100/140 |
| 6,158,336 A | 12/2000 | Cambiano | |
| 2009/0145309 A1* | 6/2009 | Fox | B30B 9/3007 100/35 |
| 2013/0081548 A1* | 4/2013 | Warren | B30B 15/0094 100/99 |

* cited by examiner

WASTE COMPACTOR

RELATED APPLICATION

This application is a U.S. Non-Provisional Patent Application which claims priority to U.S. Provisional Patent Application Ser. No. 61/654,458, filed on Jun. 1, 2012 and titled "Waste Compactor," which is hereby incorporated by reference in its entirety.

TECHNICAL FIELD

The invention is generally applicable to a waste compactor. More specifically, the invention is applicable to a waste compactor including one or more secondary fill door which enables an operator to preload the waste compactor without cycling the compacting unit, thus conserving energy, increasing the life expectancy of the compactor, reducing the number of compaction cycles that may be necessary to compact the contents of the container and/or permitting loading of the waste compactor even when the waste compactor is inoperable.

BACKGROUND OF INVENTION

Waste compactors are used to compact waste and refuse materials to reduce the size and volume of the materials. It is desirable to compact waste and refuse materials for many reasons. For example, it is desirable to compact waste and refuse materials to reduce the space that is taken up by the materials in waste containers, dumps, landfills, etc. It is also desirable to compact waste and refuse materials to reduce the frequency which a waste container must be emptied, thus reducing the costs associated with the emptying of the waste container.

It is desirable to provide such a waste compactor which operates in an efficient manner. It is also desirable to provide a waste compactor which decreases the number of compaction cycles necessary to fill a given waste container with compacted waste and refuse materials, and that the energy used by each compaction cycle be directed towards compacting waste. Cycles of the compactor only operate to compact waste material when the compactor is full. Before the compactor is full, compaction cycles serve only to fill the compactor with un-compacted waste and refuse materials. In a typical waste compactor, waste may be moved within the container approximately 80% of the time, and may be compacted only approximately 20% of the time. Therefore, it is also desirable to provide a waste compactor which can be filled without running a compaction cycle to avoid unnecessary cycling of the compactor. The present invention has applicability to a variety of compactors, including but not limited to self contained compactors, stationary compactors, vertical compactors, apartment style compactors, pre-crusher compactors as well as other compactor types.

Features and advantages of the invention will be set forth in part in the description which follows, and in part will be obvious from the description, or may be learned by practice of the invention. The accompanying drawings, which are incorporated in and constitute a part of this specification, illustrate several embodiments of the invention, and together with the description, serve to explain the principles of the invention.

DETAILED DESCRIPTION OF THE INVENTION

Figure 1:
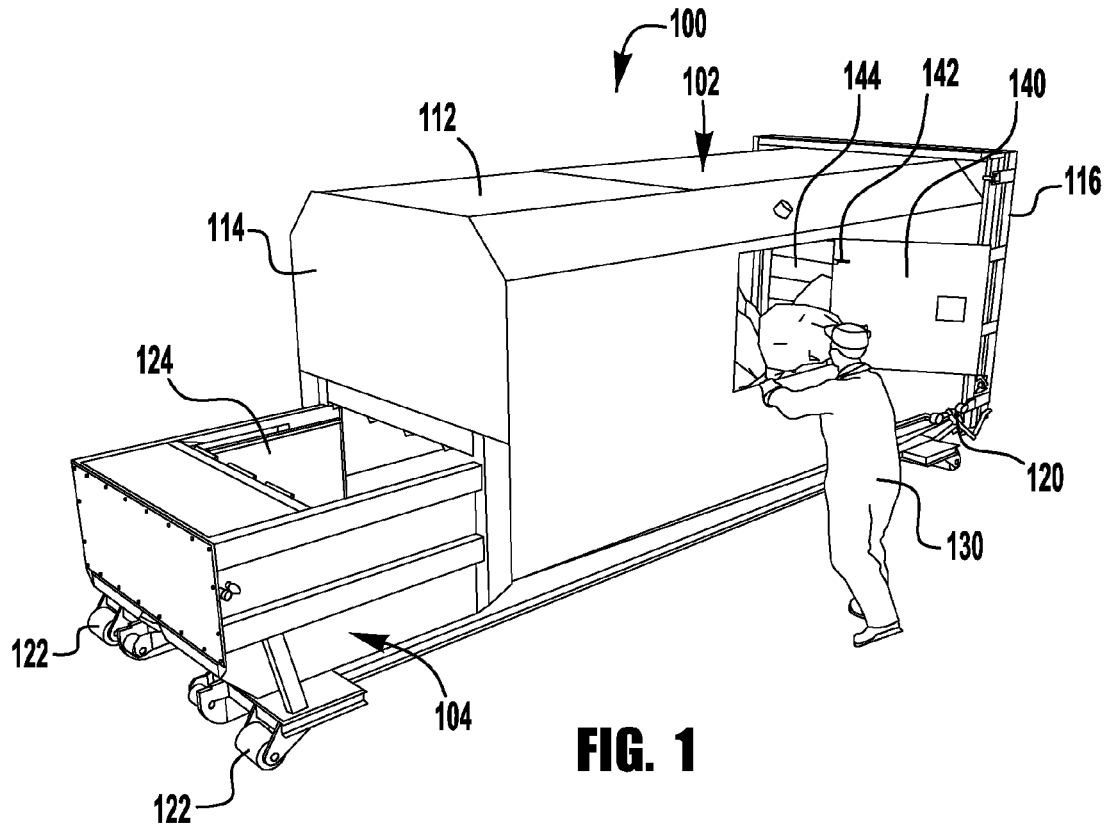
FIG. 1 shows a perspective view of one exemplary, non-limiting embodiment of a waste compactor.

The present invention will now be described with occasional reference to specific embodiments of the invention. This invention may, however, be embodied in different forms and should not be construed as limited to the embodiments set forth herein. Rather, these embodiments are provided so that this disclosure will fully convey the scope of the invention to those skilled in the art and are not intended to limit the scope of the invention in any way.

Also, while the detailed exemplary embodiments described in the specification and illustrated in the drawings relate to a self contained type compactor, in which a compacting unit is structurally integrated with a waste container, it should be understood that the waste compactor described herein has applicability to a variety of compactors, including but not limited to stationary compactors, vertical compactors, apartment style compactors, pre-crusher compactors as well as other compactor types.

Except as otherwise specifically defined herein, all terms used herein have the same meaning as commonly understood by one of ordinary skill in the art to which this invention belongs. The terminology used in the description of the invention herein is for describing particular embodiments only, and is not intended to be limiting of the invention. As used in the description of the invention, the singular forms "a," "an," and "the" are intended to include the plural forms as well, unless the context clearly indicates otherwise.

Unless otherwise indicated, all numbers expressing quantities, properties, and so forth as used in the specification are to be understood as being modified in all instances by the term "about." Accordingly, unless otherwise indicated, the numerical properties set forth in the following specification are approximations that may vary depending on the desired properties sought to be obtained in embodiments of the present invention. Notwithstanding that the numerical ranges and parameters setting forth the broad scope of the invention are approximations, the numerical values to the extent that such are set forth in the specific examples are reported as precisely as possible. Any numerical values, however, inherently contain certain errors necessarily resulting from error found in their respective measurements.

Figure 2:
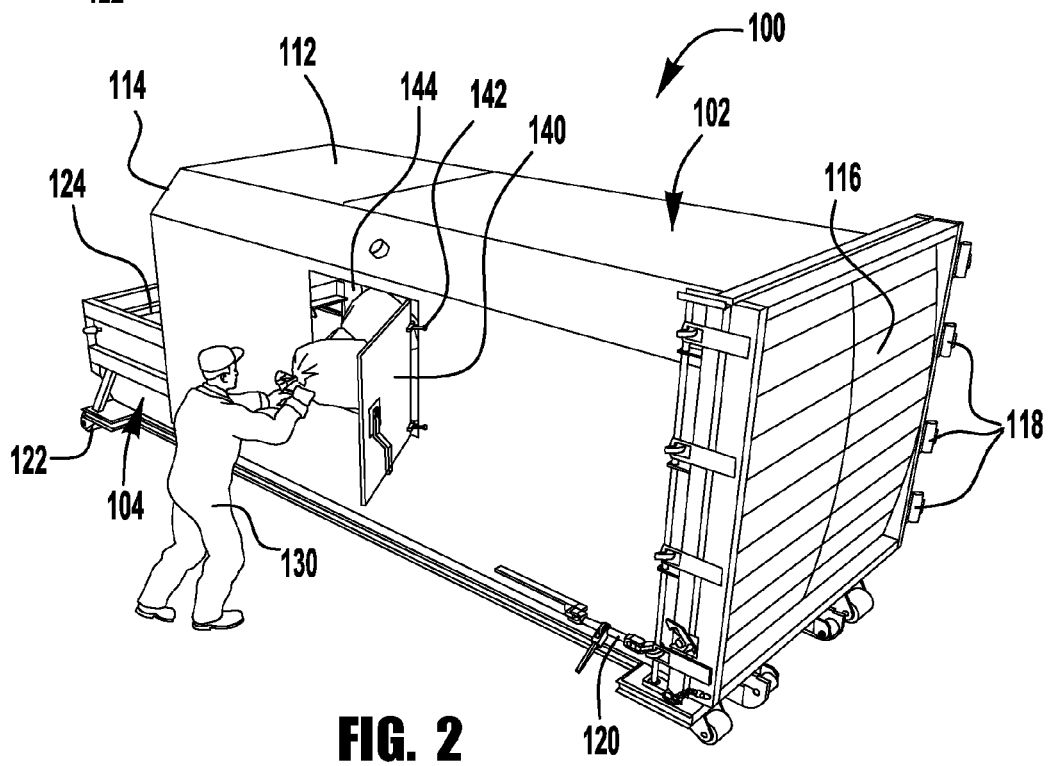
FIG. 2 shows a rear perspective view of the embodiment of waste compactor of FIG. 1.

FIGS. 1-2 shows one exemplary embodiment of a waste compactor 100. Referring to FIGS. 1-2, the waste compactor 100 generally includes a container portion 102, a charge box portion 104, and a secondary fill door 140. The secondary fill door 140 allows an operator of the waste compactor 100 to bypass the charge box portion 104 and fill the container portion 102 without cycling the waste compactor 100. Filling the container portion 102 without cycling the compactor 100 can serve to conserve energy, increase the life expectancy of the compactor and/or reduce the number of compaction cycles that may be necessary to compact the contents of the container.

Furthermore, the ability to fill the container portion 102 without cycling the compactor 100 can also provide a means by which the container portion 102 can be filled even if the waste compactor is inoperable (due to loss of power, mechanical failure, etc.). With many conventional self contained compactors, if the compactor becomes inoperable, the container portion cannot be filled. No materials can be inserted into the container portion until the waste compactor is repaired or otherwise returned to operability. During the time period when the compactor is inoperable and the container cannot be loaded, users will pile up or otherwise place trash or other materials that were intended to be loaded into the waste compactor 100 outside of the waste compactor, find another waste compactor, waste container or other receptacle in which they can place the trash, or refrain from throwing away waste until the waste compactor is returned to operation. However, with the exemplary embodiments of waste compactor 100 disclosed herein, the secondary fill door 140 allows for the loading of materials into the container portion 102 of the waste compactor 100 even when the compactor is inoperable. In this manner, the inconvenience of not being able to load the container when the compactor is inoperable can be avoided. In addition, the safety concerns and unsightliness resulting from trash or other waste materials being placed next to, on, or around the waste compactor until it is repaired or the inconvenience of needing to find another place to dump the waste during the period when the waste compactor is inoperable can be alleviated.

The container portion 102 is generally an enclosed container made up of a plurality of side walls 112, a front wall 114 and an end wall 116. The end wall 116 of the illustrated exemplary embodiment is hingebly attached to the container portion 102 by a plurality of hinges 118. The end wall 116 is pivotable between a closed position and an open position on the hinges 118 to permit the emptying of the container portion 102 when the container portion 102 becomes full. While the end wall 116 of the illustrated embodiment is hingebly attached to the container portion 102 by hinges, it should be understood that the end wall 116 may be attached to the container portion 102 in any of a variety of suitable manners in additional embodiments. For example, in additional embodiments, the end wall 116 may be a sliding door that slides between an open and closed position. Furthermore, in additional embodiments, the end wall 116 may include two or more panels or sections that combine to form the end wall 116. For example, the end wall 116 could include two vertically oriented or horizontally oriented door panels or each sections that each open to expose half of the interior of the container portion 102.

The waste compactor 100 of various embodiments may include a lock 120 or other device to retain the end wall 116 in the closed position until it is desired that the container portion 102 be emptied. The lock 120 may take the form of a variety of suitable locking devices in various embodiments. For example, the lock 120 may include one or more chains, locking bars, hooks, or other elements or combinations thereof that engage the end wall 116 and the container and the container portion to retain the end wall 116 in a closed position until it is desired that the container portion 102 be emptied.

The shape and configuration of each of walls 112, 114, 116 of the container portion 102 of the waste compactor 100 may vary in various embodiments. In addition, the overall shape of container portion 102 (and waste compactor 100) may vary in various embodiments and the shape of the container portion 102 is not limited to the shape of the exemplary embodiment of the container portion 102 shown in FIGS. 1-2. For example, as seen in FIG. 2, the end wall 116 of the illustrated embodiment of the container portion 102 of the waste compactor has a slightly curved profile (when viewed by the side) and extends outwardly from the rear of the container. As waste material is compacted within the container portion 102, this curved profile of the end wall 116 of the illustrated exemplary embodiment helps to urge waste materials that are being compacted at the bottom of the container portion 102 upwardly along the curved profile of the end wall towards the top of the container portion 102. This circulating effect of the waste material caused by the curved end wall assists in the effective filling of the entire container portion 102 even if only the waste material in the lower regions of the container portion 102 is being compacted. In embodiments of the waste compactor 100 that include an end wall 116 made up of multiple sections, one or more of each such sections may possess such a curved profile. However, additional embodiments of the waste compactor 100 may include an end wall having any variety of suitable shapes and configurations. For example, additional embodiments of the waste compactor 100 may be provided with a flat end wall 116 that does not have such a curvature.

The container portion 102 of the present application may have a variety of different sizes in various embodiments. For example, various embodiments of the container portion 102 may be of a variety of suitable sizes, including but not limited to 25 cubic yards, 30 cubic yards, 34 cubic yards, or various other sizes.

The walls 112, 114, 116 of the container portion 102 of the waste compactor 100 according to the present invention may be formed of one or more of a variety of suitable materials. The particular material is generally selected to be compatible with the intended purpose and desired qualities of the waste compactor 100. For example, in various embodiments, the walls 112, 114, 116 of the container portion 102 may be made from one or a combination of metals, such as steel or aluminum.

The illustrated embodiment of the waste compactor 100 includes a plurality of wheels 122 that support the waste compactor 100 and allow it to be moved if desired. However, additional embodiments of the waste compactor 100 may be provided without any such wheels. Additional embodiments of waste compactor 100 may include legs or other supports that serve to raise the waste compactor 100 off of the ground. Furthermore, in additional embodiments of waste compactor 100, the bottom of waste compactor 100 may rest directly on the ground or other supporting surface and not be raised up in any manner.

Referring again to FIGS. 1-2, the illustrated embodiment of waste compactor 100 includes a charge box portion 104. The charge box portion 104 includes a hopper opening 124 to permit access to the charge box portion 104 for loading the charge box portion 104 with waste materials for loading/compacting into the container portion 102. The charge box portion 104 is constructed from walls designed and adapted to withstand the forces generated by the loading/compacting of the waste materials. The waste materials inserted into the charge box portion 104 via the hopper opening 124 are forced into the container portion 102 by a ram (not shown) driven by a hydraulic cylinder (not shown) or similar device. Once the container portion 102 is sufficiently full, the ram operates to compact the waste materials within the container portion 102.

The operation of the hydraulic cylinder or similar device is driven by a power unit (including, for example, one or more hydraulic pumps, hydraulic tanks, electric motors, and/or directional valves, etc.) (not shown) and controlled by an electronic controller or other control mechanism (including, for example, one or more transformers, motor starters, relays, fuses, switches, circuit boards, an/or programmable controllers, etc.) (not shown). The hydraulic ram moves generally horizontally, back and forth, within the charge box portion 104 and the container portion 102. In the illustrated exemplary embodiment the hydraulic ram serves to force the waste material into the container portion 102. After the completion of multiple, successive cycles of loading the charge box portion 104 with waste materials, forcing the contents of the charge box portion 104 into the container portion 102, and/or compacting the contents of the container portion 102, the container portion 102 will become filled. Once the container portion 102 is filled with compacted waste, the container portion 102 is then emptied.

The shape and configuration of the charge box portion 104 of the waste compactor 100 may vary in various embodiments. The charge box portion 104 may also have a variety of different sizes in various embodiments. It should be understood that various additional embodiments of the charge box portion 104 of the waste compactor of the present invention may be of a variety of suitable sizes, including but not limited to 2 cubic yards, 3 cubic yards, or various other sizes. Additional embodiments of the waste compactor 100 may include a variety of different suitable types of compacting devices. For example, additional embodiments of the waste compactor 100 may include a pre-crusher, which serves to compact the waste materials within the pre-crusher (such as pallets or other stout or robust items which may need to be crushed or broken down to conserve space and/or prevent blockages within the container portion 102) prior to inserting and/or compacting the waste materials in the container portion 102.

Referring again to FIGS. 1-2, the illustrated embodiment of waste compactor 100 includes a secondary fill door 140. Before the container portion 102 is filled to capacity with un-compacted waste, cycles of the waste compactor 100 only serve to move waste from the charge box portion 104 to the container portion 102. To avoid unnecessary compaction cycles, it is desirable that the container portion 102 be accessible for preloading by the user 130 through the secondary fill door 140.

The secondary fill door 140 of the illustrated exemplary embodiment is hingebly attached to the container portion 102 by a plurality of hinges 142 to permit the user 130 to preload the container portion 102. The secondary fill door 140 is pivotable between a closed position and an open position on the hinges 142 to permit the filling of the container portion 102 through the secondary fill opening 144 without cycling the waste compactor 100 or filling the charge box portion 104. It should be noted that the secondary fill door 140 of various additional embodiments may be attached to the container 102 in a variety of different ways. For example, the secondary fill door 140 may be a sliding door, as discussed in more detail herein with respect to the embodiment illustrated in FIGS. 3-4. The secondary fill door 140 of the illustrated embodiment includes a handle or latch 146 for assisting in opening and closing the secondary fill door 140. In the illustrated embodiment, the secondary fill door 140 includes a handle 146 that rotates between an open position and closed position. When the handle 146 of the illustrated embodiment, is in the closed position, the secondary fill door 140 is prevented from opening and when the handle is in the open position, the secondary fill door 140 is able to be opened. With the illustrated embodiment of the waste compactor 100, a user 300 who desires to open the secondary fill door 140 moves the handle 146 to the open position and use the handle 146 to pull the secondary fill door 140 open.

It should be understood that additional embodiments of the waste compactor 100 may include a secondary fill door 140 with one or more of a variety of different suitable latches or handles. For example, additional embodiments of the secondary fill door may include a handle or latch that slides between an open or closed position or any other variety of suitable latching devices, such as, for example, one or more hasps, slidable locking bars, spring latches, slam latches, cam locks, barrel bolts, padbolts, compression latches, draw latches, key entry latches, L-handle latches, T-handle latches, folding T-handle latches, wing handle latches, recessed or flush latches, toggle latches, quarter-turn latches, etc. In addition, the waste compactor 100 of various embodiments may include one or more locking device, such as a lock (not shown) or other securing device to retain the secondary fill door 140 in the closed position until the lock or securing device is unlocked to prevent undesired access to the container portion 102 via the secondary fill door 140.

For convenience and/or safety purposes, it is desirable that the compacting device of the waste compactor 100 be prevented from cycling while the secondary fill door 140 is in the open position, as the user 130 may be harmed by the operation of the waste compactor 100 if access is permitted to the container portion 102 during compaction. For this reason, the secondary fill door 140 of various exemplary embodiments may also include one or more optional safety sensors (not shown). The one or more sensors may use magnets or some other kind of sensing device to detect when the secondary fill door 140 is in the open position and/or closed position. For example, in various embodiments, one or more magnetic, inductive, capacitive, optical, ultrasonic, mechanical, limit switch, capacitive displacement, eddy-current, laser rangefinder, magnetic proximity fuse, passive optical, passive thermal infrared, photocell (reflective), radar, sonar. ultrasonic or other suitable types of sensor may be provided to detect when the secondary fill door 140 is in the open position and/or closed position. The one or more sensors may be mounted to one or both of the secondary fill door 140 or the container portion 102 at one or more locations. The one or more sensors are in communication with the electronic controller or other control mechanism of the compacting device to deactivate the hydraulic ram or other compacting device of the waste compactor 100 when the secondary fill door 140 is in the open position. When the one or more sensors detects that the secondary fill door 140 is in the open position, the waste compactor 100 is rendered inoperable with the hydraulic ram or other compacting device being unable to be actuated to compact waste materials within the waste compactor 100. A light or other display mechanism may also be attached to the waste compactor 100 to visually indicate to the user 130 when the secondary fill door is in the open position and the compacting device of the waste compactor 100 is not able to be activated.

For convenience and/or safety purposes, in various additional embodiments, the waste compactor 100 may include one or more optional fullness sensor (not shown) to detect whether the container portion 102 is sufficiently full such that use of the secondary fill door 140 would not be beneficial or may not be possible because the secondary fill opening 144 could be blocked with waste materials (either compacted or otherwise). The one or more fullness sensors may be mounted to one or both of the secondary fill door 140 or the container portion 102 at one or more locations. The one or more fullness sensors may use lasers, cameras or some other kind of optical, mechanical or other type of sensing device to detect when the container portion 102 is full. In addition, the one or more fullness sensors may be an electronic device that monitors the pressure exerted by the compacting devices, such as by monitoring the current drawn by an electric motor powering the compacting device or other performance parameter of the compacting device, to determine the fullness of the waste compactor 100. A light or other display mechanism may also be attached to the sensor to visually indicate to the user 130 that the container portion 102 is sufficiently full and that pre-filling the container portion 102 via the secondary fill door 140 may not be beneficial or possible. Upon receiving indication from the light or display mechanism that the container portion 102 is sufficiently full, an operator would recognize that pre-filling the container portion 102 may not be beneficial or possible and a compaction cycle may be necessary to further fill the container. Furthermore, in various embodiments, the optional lock for keeping the secondary fill door 140 closed may not unlock when the sensor determines that the container portion 102 is filled to a certain fullness level.

The location and configuration of the secondary fill door 140 of the waste compactor 100 may vary in various embodiments and more than one secondary fill door 140 may be provided. For example, in various additional embodiments, the secondary fill door may be located on one or more of the side walls 112, front wall 114 and/or end wall 116 of the waste compactor. For example, additional embodiments of the waste compactor 100 may include a secondary fill door 140 located on the front wall 112 of the container portion 102 near the charge box portion 104 or a secondary fill door 140 located on the top of the container portion 102. The secondary fill door 140 may also have a variety of different sizes and shapes in various embodiments.

The secondary fill door 140 of the waste compactor 100 according to the present invention may be formed of one or more of a variety of suitable materials. The particular material is generally selected to be compatible with the intended purpose and desired qualities of the waste compactor 100, and may be similar or identical to the material selected for the walls 112, 114, 116 of the container portion 102. For example, the secondary fill door 140 may be made from one or a combination of metals, such as steel or aluminum.

Figure 3:
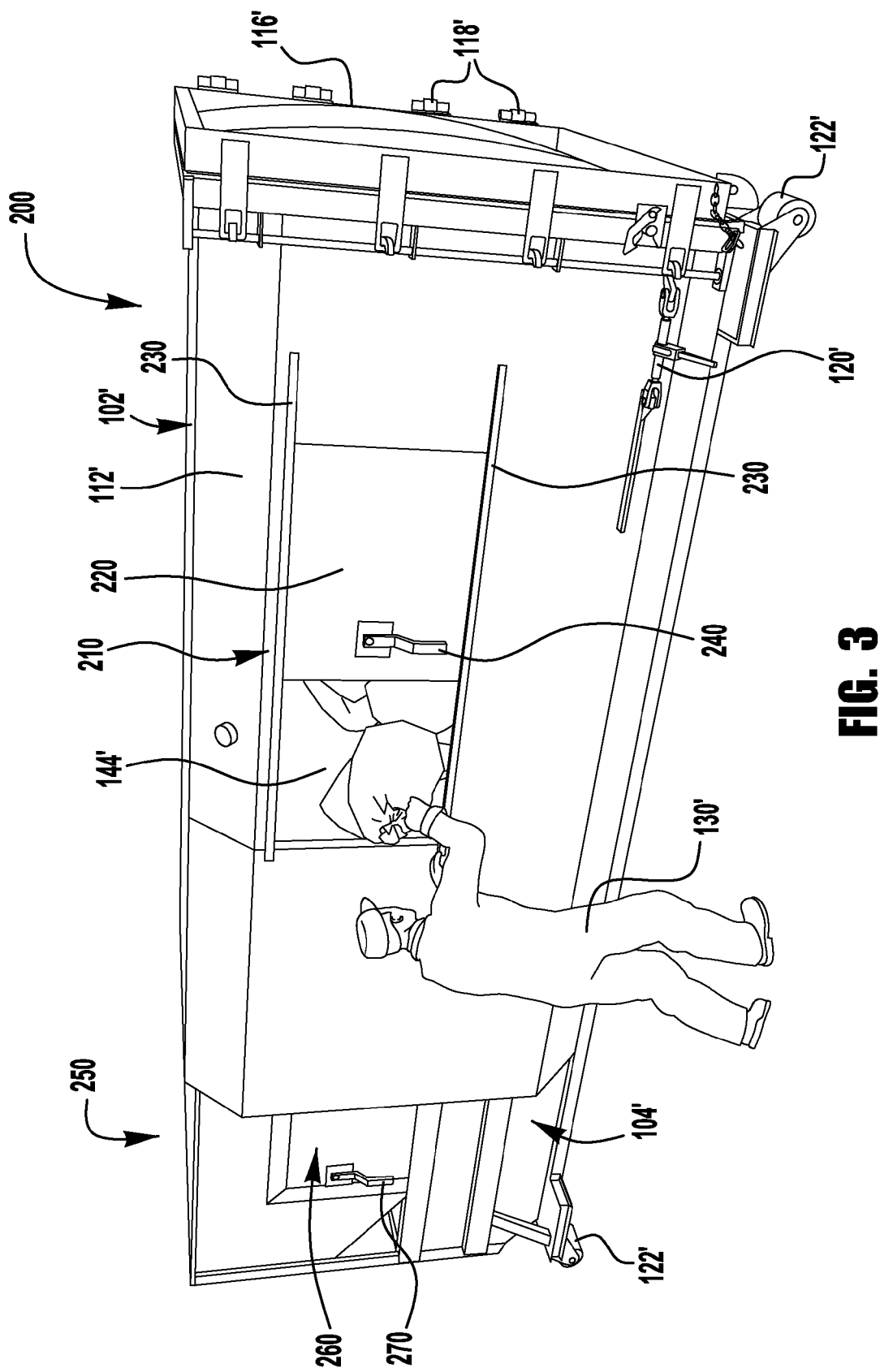
FIG. 3 shows a perspective view of a second exemplary, non-limiting embodiment of a waste compactor.

Referring now to FIG. 3, an additional exemplary embodiment of waste compactor 200 is shown. The prime symbol is utilized in FIG. 3 to indicate elements of waste compactor 200 which may be similar but may not be identical to elements of waste compactor 100. The exemplary embodiment of waste compactor 200 includes a sliding secondary fill door 210 comprised of a door panel 220 which is configured and adapted for sliding relative to rails or tracks 230 between and open and closed position to cover and uncover secondary fill opening 144'. The door panel 220 could be mounted within the container portion 102' with the rails or tracks 230 on the interior of the container portion 102' or the door panel 220 could be mounted exterior of the container portion 102' with the rails 230 on the outside of the container portion 102'. The exemplary illustrated embodiment of waste compactor 200 includes an optional charge box enclosure 250 for generally enclosing the charge box opening. The exemplary illustrated embodiment of optional charge box enclosure 250 includes a door 260 that is moveable between an open position and closed position to permit or prevent access to the charge box portion 104'. While door 260 is hingebly mounted to the charge box enclosure, it should be understood that a variety of suitable types of door, such as a slidable door, may be provided in additional embodiments. The door 260 of the illustrated embodiment includes a handle or latch 270 for assisting in opening and closing the door 260. In the illustrated embodiment, the 260 includes a handle 270 that rotates between an open position and closed position. When the handle 270 of the illustrated embodiment, is in the closed position, the door 260 is prevented from opening and when the handle is in the open position, the door 260 is able to be opened. It should be understood that additional embodiments of the waste compactor 200 may include a door 260 with one or more of a variety of different suitable latches or handles. In addition, the waste compactor 200 of various embodiments may include one or more locks (not shown) or other securing device to retain the door 260 in the closed position until the lock or securing device is unlocked to prevent undesired access to the charge box portion 104'. The charge box enclosure 250 serves to prevent undesired access to the charge box portion 104' and to prevent the undesired loading of materials into the charge box portion 104'.

Figure 4:
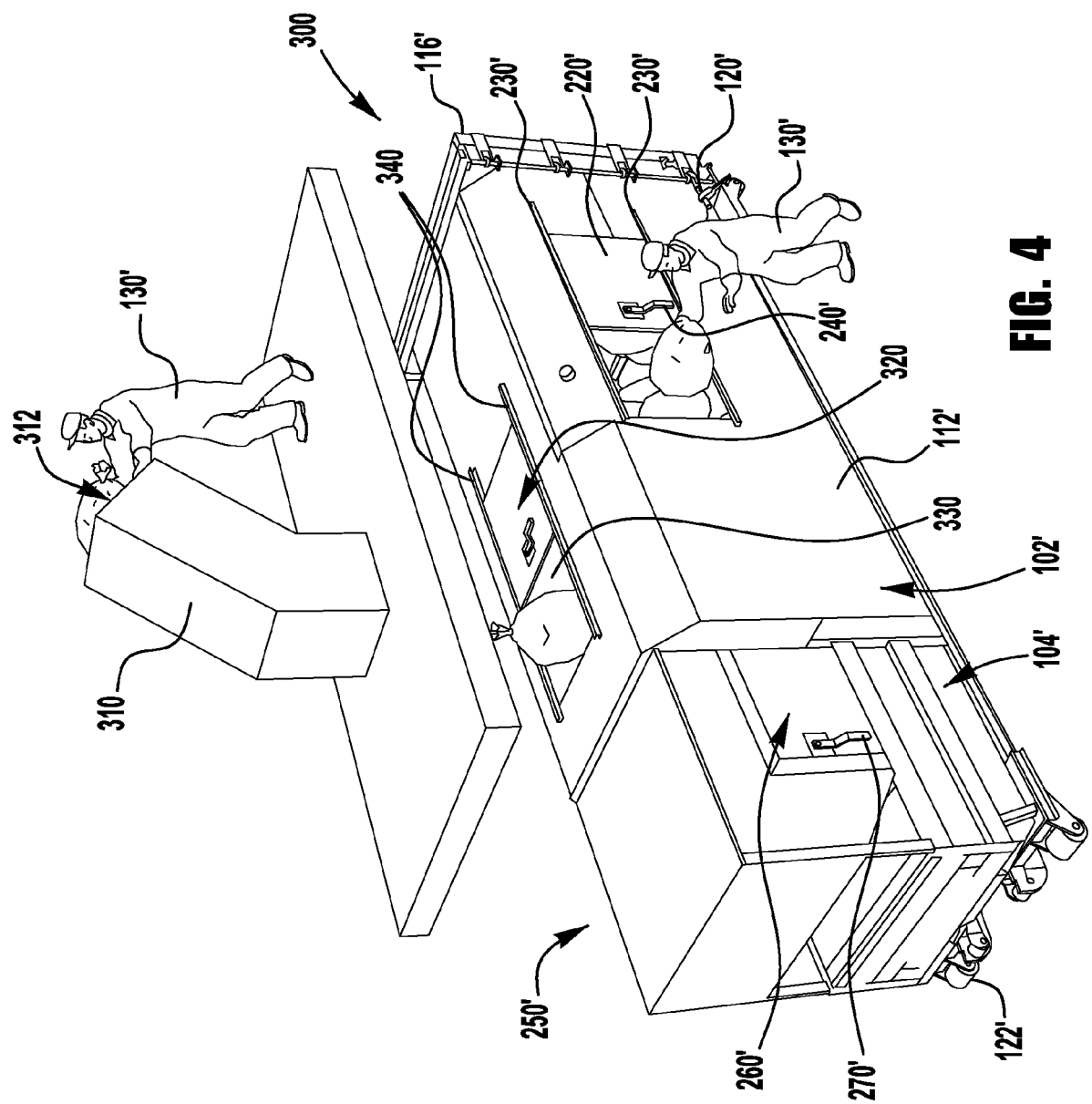
FIG. 4 shows a perspective view of a second exemplary, non-limiting embodiment of a waste compactor.

Referring now to FIG. 4, an additional exemplary embodiment of waste compactor 300 is shown. The prime symbol is utilized in FIG. 4 to indicate elements of waste compactor 300 which may be similar but may not be identical to elements of waste compactor 100 and/or 200. In the illustrated embodiment of the waste compactor 300, the waste compactor includes an optional loading chute 310. The loading chute 310 is adapted to allow a user 130' of the waste compactor 300 to load the container portion 102' of the waste compactor 300. For example, in various embodiments, the loading chute 310 may be adapted to allow a user 130 of the waste compactor 300 to load the container portion 102' of the waste compactor 300 from the interior of a building or other structure. The loading chute 310 of various embodiments can have a variety of shapes and configurations. For example, the loading chute may have a generally rectangular or circular interior cross-section. Loading chute 310 may be constructed from a variety of suitable materials, such as one or a combination of metals, such as steel or aluminum, or one or a combination of thermoplastic or elastomeric materials. The loading chute 310 includes an inlet end 312 which is accessible from the interior of a building other structure. The loading chute 310 of various embodiments of waste compactor 100 may traverse or pass through one or more walls of a structure or other similar barriers to reach the location of the waste compactor 300.

In the illustrated embodiment of waste compactor 300, a door 320 is provided which selectively covers and uncovers opening 330 in the container portion 102' of waste compactor 300. Door 320 is a slidable door that slides between an open position and a closed position on rails 340. However, as discussed previously, a variety of suitable types of door may be provided for door 320. In addition, no door may be provided in certain embodiments. The outlet of loading chute 310 is in communication with or in proximity with opening 330 so that waste materials exiting the loading chute 310 will pass through opening 330 and enter the container portion 102'. It should be understood that while opening 330 is located at the top of the waste compactor 300, opening 330 may be located at any location on the walls 112', 114', or 116' of the container portion 102' of the waste compactor 300. In various embodiments, a user 130' can initiate a compaction cycle of the waste compactor at a remote location from the waste compactor 300, such as near the inlet end 312 of the loading chute 310 inside a building or structure. For example, once a fullness sensor detects that the container portion 102' is filled to a predetermined level, a compaction cycle could be initiated by the user 130' at a remote location from the waste compactor 300 (such as within a building or structure).

An optional light or other display mechanism may be provided in various embodiments of waste compactor 300 to visually indicate to the user 130' that the container portion 102' is sufficiently full and that pre-filling the container portion 102' via the loading chute 310 may not be beneficial or possible. Upon receiving indication from the light or display mechanism that the container portion 102' is sufficiently full, an operator would recognize that pre-filling the container portion 102' may not be beneficial or possible and a compaction cycle may be necessary to further fill the container. Furthermore, in various embodiments, an optional door or other locking device may be provided for closing the inlet end 312 of the loading chute 310 when the sensor determines that the container portion 102' is filled to a certain fullness level to prevent further loading of waste materials into the loading chute 310, and thus prevent the loading chute 310 from becoming jammed with waste materials that cannot enter the container portion 102' due to the fullness level of the container portion 102'.

Additional exemplary embodiments of the waste compactor 300 may be provided with a loading chute 310 that is in communication with both the container portion 102' and the charge box portion 104' of the waste compactor 300. Such loading chutes 310 can be used for the selective loading of waste materials into both the container portion 102' and charge box portion 104' of the waste compactor 300. In this manner, if the container portion 102' is filled to a fullness level where additional loading of the container portion 102' would not be possible or would not be advisable, the charge box portion 102 of the waste compactor could be loaded with waste material by the loading chute 310. Such embodiments of waste compactor, may be provided with an optional diverter device that can be used to selectively direct waste materials inserted into the loading chute 310 into either the container portion 102' or the charge box portion 104' depending upon the fullness of the container portion 102'. Such diverting device may be automatically or manually operated. For example, in various embodiments, the diverting device may be in communication with one or more fullness sensors that detect the fullness of the container portion 102' If the fullness sensor detects that the container portion 102' is filled to a predetermined level, the diverting device may automatically direct any additional waste material inserted into the loading chute 310 to the charge box portion 104' until the fullness sensor detects that the additional loading of waste materials into the container portion 102' would be possible.

As shown in the illustrated embodiment of waste compactor 300, more than one secondary fill opening (such as fill openings 114' and 330) may be provided in various embodiments to permit the loading of the container portion 102' of the waste compactor 300 from both a remote location (such as within a building or structure) via loading chute 310 and opening 330 as well as loading of the container portion 102' of the waste compactor 300 at the waste compactor site via opening 114'.

As mentioned previously, while the detailed exemplary embodiments described in the specification and illustrated in the drawings relate to a self contained type compactor, in which a compacting unit is structurally integrated with a waste container, it should be understood that the waste compactor described herein has applicability to a variety of compactors, including but not limited to stationary compactors, vertical compactors, apartment style compactors, pre-crusher compactors as well as other compactor types.

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. For example, where components are releasable or removably connected or attached together, any type of releasable connection may be suitable including for example, locking connections, fastened connections, tongue and groove connections, etc. Still further, component geometries, shapes, and dimensions can be modified without changing the overall role or function of the components. Therefore, the inventive concept, in its broader aspects, is not limited to the specific details, the representative apparatus, and illustrative examples shown and described. Accordingly, departures may be made from such details without departing from the spirit or scope of the applicant's general inventive concept.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

The invention claimed is:

1. A waste compactor comprising:
   a container;
   a charge box in communication with the container, the charge box having an opening defined therein by which material to be compacted can be inserted into the charge box;

a compacting device operative to push material to be compacted inserted into the charge box into the container;

a secondary fill opening defined in the container which is selectively covered by a secondary fill door moveable between a closed position and an open position, wherein the secondary fill opening permits deposit of material to be compacted directly into the container; and a sensor that detects when the secondary fill door is in the open position and wherein the compacting device is prevented from being activated when the secondary fill door is in the open position.

2. The waste compactor of claim 1, wherein the sensor comprises a magnetic sensor.

3. The waste compactor of claim 1 further comprising a fullness sensor that detects when the container is filled to a predetermined fullness level.

4. The waste compactor of claim 3, further comprising a locking device that prevents the secondary fill door from opening when the fullness sensor detects that the container is filled to a predetermined fullness level.

5. The waste compactor of claim 1, wherein the secondary fill door is connected to the container by one or more hinges and pivots between the open position and closed position.

6. The waste compactor of claim 1, wherein the container comprises an end wall moveable between a closed position and an open position for emptying the container when desired.

7. A waste compactor comprising:

a container;

a charge box in communication with the container, the charge box having an opening defined therein by which material to be compacted can be inserted into the charge box;

a compacting device operative to push material to be compacted inserted into the charge box into the container;

a secondary fill opening defined in the container which is selectively covered by a secondary fill door moveable between a closed position and an open position, wherein the secondary fill opening permits deposit of material to be compacted directly into the container;

a sensor that detects when the secondary fill door is in the open position and wherein the compacting device is prevented from being activated when the secondary fill door is in the open position; and a fullness sensor that detects when the container is filled to a predetermined fullness level.

8. The waste compactor of claim 7, further comprising a locking device that prevents the secondary fill door from opening when the fullness sensor detects that the container is filled to a predetermined fullness level.

* * * * *